(12) United States Patent
Kim et al.

(10) Patent No.: US 8,625,308 B2
(45) Date of Patent: Jan. 7, 2014

(54) SOFT-BURST CIRCUIT FOR SWITCHED-MODE POWER SUPPLIES

(75) Inventors: Jin-Tae Kim, Seoul (KR); Kwang-Il Lee, Gyeonggi (KR); Gwan-Bon Koo, Gyeonggi (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 728 days.

(21) Appl. No.: 12/367,290

(22) Filed: Feb. 6, 2009

(65) Prior Publication Data

US 2010/0202170 A1 Aug. 12, 2010

(51) Int. Cl.
 H02M 3/335 (2006.01)
 H02M 3/337 (2006.01)
(52) U.S. Cl.
 USPC .................. 363/21.01; 363/21.07; 363/97
(58) Field of Classification Search
 USPC ............. 323/288, 901; 363/15, 16, 21, 21.01, 363/21.04, 21.07, 21.09, 49, 97
 See application file for complete search history.

(56) References Cited

U.S. PATENT DOCUMENTS

| 5,321,235 | A | * | 6/1994 | Makino et al. ................. 219/716 |
| 6,477,066 | B2 | | 11/2002 | L'Hermite |
| 6,781,356 | B1 | * | 8/2004 | Yang et al. ..................... 323/282 |
| 7,298,124 | B2 | * | 11/2007 | Kan et al. ....................... 323/283 |

OTHER PUBLICATIONS

FSFR-Series—Fairchild Power Switch (FPS) for Half-Bridge Resonant Converters, May 2009, pp. 1-17, Fairchild Semiconductor Corporation.
Switched-mode power supply—Wikipedia, the free encyclopedia, pp. 1-10 [retrieved on Jan. 30, 2009]. Retrieved from the internet: http://en.wikipedia.org/wiki/Switched-mode_power_supply.

* cited by examiner

*Primary Examiner* — Adolf Berhane
*Assistant Examiner* — Nusrat Quddus
(74) *Attorney, Agent, or Firm* — Okamoto & Benedicto LLP

(57) ABSTRACT

A switched-mode power supply includes a soft-burst circuit to minimize or prevent distracting audible noise. The power supply includes a control circuit for controlling switching of an output transistor to deliver a regulated output voltage to a load. The control circuit adjusts the operating frequency of the power supply based on a control signal. The soft-burst circuit discharges a storage device to minimize or prevent audible noise when the control signal reaches a particular level.

17 Claims, 4 Drawing Sheets

SOFT-BURST CIRCUIT FOR SWITCHED-MODE POWER SUPPLIES

BACKGROUND OF THE INVENTION

1. Field of the Invention

The present invention relates generally to electrical circuits, and more particularly but not exclusively to soft-burst circuits for switched-mode power supplies.

2. Description of the Background Art

A power supply is an electrical circuit that receives an input voltage to deliver a regulated output voltage to a load. In a switched-mode power supply, switching of a single transistor or a pair of synchronously switched transistors is controlled to maintain the output voltage to within a desired output voltage range. One problem with switched-mode power supplies is that undesirable audible noise may occur when varying the switching frequency of the output transistors. The audible noise is especially problematic in high-efficiency power supplies that use pulse-skipping techniques to turn off the output transistors at light load levels.

SUMMARY

In one embodiment, a switched-mode power supply includes a soft-burst circuit to minimize or prevent distracting audible noise. The power supply includes a control circuit for controlling switching of an output transistor to deliver a regulated output voltage to a load. The control circuit adjusts the operating frequency of the power supply based on a control signal. The soft-burst circuit discharges a storage device to minimize or prevent audible noise when the control signal reaches a particular level.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
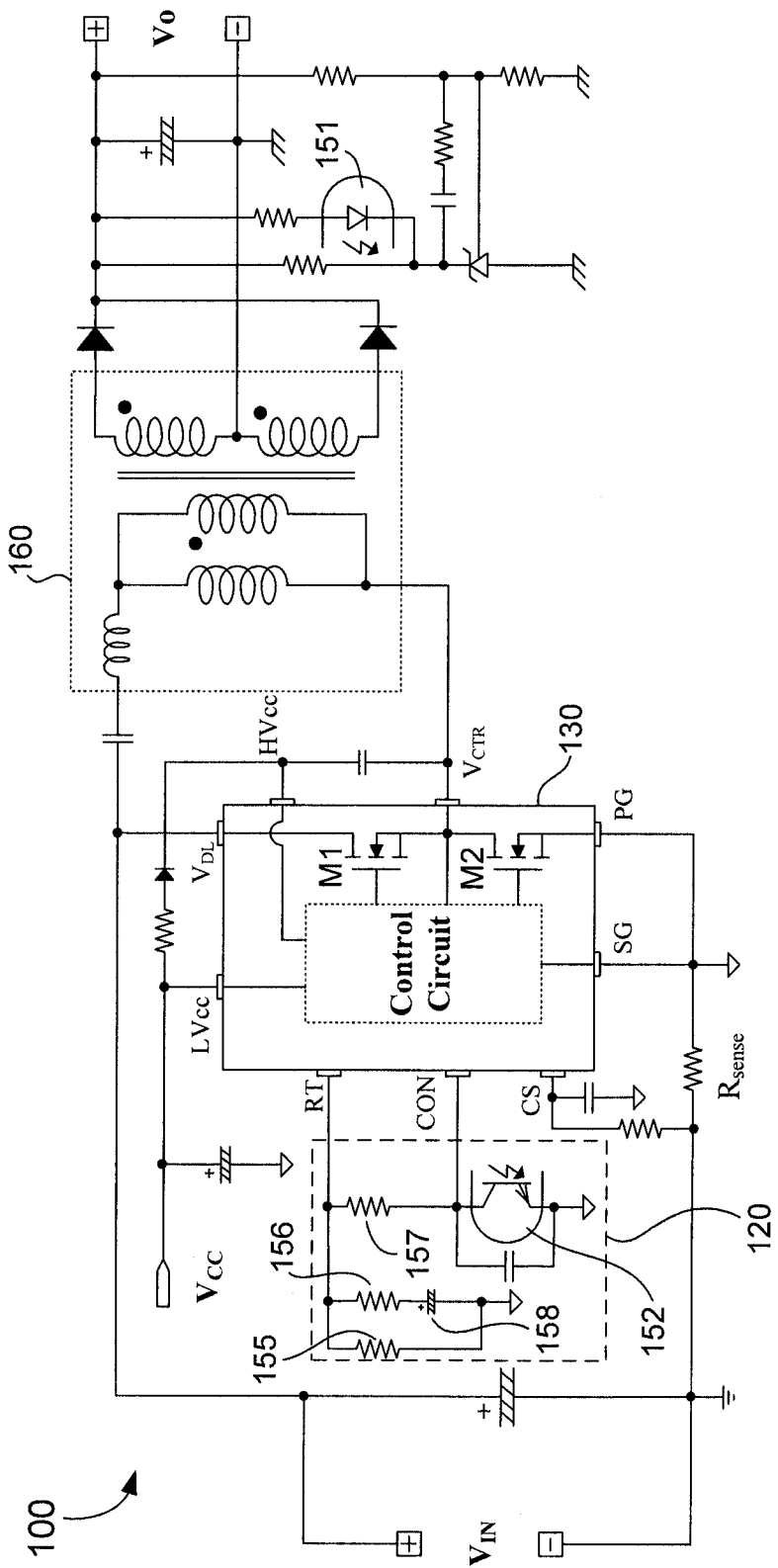
FIG. 1 schematically shows a conventional switched-mode power supply that may be adapted to take advantage of embodiments of the present invention.

FIG. 1 schematically shows a conventional switched-mode power supply that may be adapted to take advantage of embodiments of the present invention. In the example of FIG. 1, an LLC resonant half-bridge converter 100 is configured to step down an input voltage $V_{IN}$ to a lower output voltage $V_O$. For example, the converter 100 may step down an input voltage $V_{IN}$ of 400 VDC to an output voltage $V_O$ of 24 VDC, and generate an output current $I_O$ ranging from 0 to 5 A. It is to be noted that the operation of an LLC resonant half-bridge converter, in general, is well known in the art.

As is typical of modern switched-mode power supplies, the converter 100 includes an integrated circuit 130 to control switching of a pair of synchronously switched output transistors M1 and M2 to generate the regulated output voltage $V_O$. The output transistors M1 and M2 are shown as metal-oxide semiconductor field effect transistors (MOSFET) and integrated with the integrated circuit 130 for illustration purposes. However, that is not necessarily the case. For example, the transistors M1 and M2 may be bipolar transistors and/or packaged separately from the integrated circuit 130. The integrated circuit 130 may also control switching of a single output transistor rather than a pair of synchronously switched output transistors. The integrated circuit 130 may control the switching of the output transistors M1 and M2 by pulse frequency modulation (PFM).

In one embodiment, the integrated circuit 130 comprises the FSFR-Series Fairchild Power Switch™ integrated circuit from Fairchild Semiconductor of South Portland, Me. The integrated circuit 130 includes a $V_{DL}$ pin electrically connected to the transistor M1 (also referred to as "high-side transistor"), a PG pin for the power ground, an SG pin for the control ground, an $LV_{CC}$ pin for electrically connecting a supply voltage to the low-side gate drive circuit driving the transistor M2 and to control blocks, an $HV_{CC}$ pin for electrically connecting a supply voltage to the high-side gate drive circuit driving the transistor M1, a $V_{CTR}$ pin electrically connected to the drain of the transistor M2 (also referred to as "low-side transistor"), a CS pin for sensing current flowing through the transistor M2, an RT pin for setting the operating frequency of the converter 100, and a CON pin for enabling/disabling protection features of the integrated circuit 130.

In the example of FIG. 1, an opto-coupler comprising a diode 151 and a transistor 152 allows for monitoring of the output voltage $V_O$. The output of the opto-coupler transistor 152 is used as an input to the CON pin of the integrated circuit 130 to enable/disable the protection features of the integrated circuit 130 based on the output voltage $V_O$. The operation of the integrated circuit 130 is enabled when the voltage on the CON pin is above a first protection value (e.g., 0.6V). The gate drive signals for transistors M1 and M2 are disabled when the voltage on the CON pin is below a second protection value (e.g., 0.4V) lower than the first protection value. The protection is triggered, i.e., the integrated circuit 130 is disabled and does not operate, when the voltage on the CON pin is above a third protection value (e.g., 5V) higher than the first protection value.

The integrated circuit 130 includes a pulse-skipping feature wherein the switching of the transistors M1 and M2 are stopped during light load conditions to save energy. In the example of FIG. 1, the transistors M1 and M2 stop switching when the voltage on the CON pin drops below the second protection value (e.g., 0.4V), and resume switching when the voltage on the CON pin rises above the first protection value (e.g., 0.6V). The frequency that causes pulse skipping may also be configured by appropriate selection of the values of the resistors 155 and 157. In one embodiment, the frequency at which pulse skipping is entered is equal to the maximum operating frequency. The integrated circuit 130 also includes a burst mode feature wherein the transistors M1 and M2 are switched for short periods of time (also referred to as "bursting") to charge an output capacitor in between pulse skipping.

In one embodiment, the gain of the converter 100 is inversely proportional to the operating frequency in the ZVS (zero-voltage-switching) region. The output voltage can thus be regulated by modulating the operating frequency of the converter 100. In the example of FIG. 1, the output voltage $V_O$ is monitored by way of the opto-coupler diode 151. The output current of the opto-coupler transistor 152 is thus indicative of the output voltage $V_O$. The monitored output voltage from the opto-coupler transistor 152 is applied to the CON pin to enable/disable protection features of the integrated circuit 130 and for pulse-skipping. The monitored output voltage from the opto-coupler transistor 152 is also applied to the RT pin as a frequency control signal for varying the operating frequency of the converter 100, i.e., the frequency at which the transistors M1 and M2 are switched, to change its gain and thereby regulate the output voltage $V_O$.

The integrated circuit 130 may include a current controlled oscillator (not shown) that drives the transistors M1 and M2 at a frequency dictated by electrical current flowing out of the RT pin. The voltage on the RT pin may be kept at a constant voltage (e.g., 2 VDC). When the impedance on the RT pin decreases, current flowing out the RT pin increases to increase the operating frequency. When the impedance on the RT pin increases, current flowing out of the RT pin decreases and so does the operating frequency. The impedance presented by the opto-coupler transistor 152 to the RT pin changes depending on the output voltage and load current, allowing for control of operating frequency based on the output voltage.

An RC series network comprising a resistor 156 and a capacitor 158 is electrically coupled to the RT pin to provide a soft-start function to limit in-rush current when the converter 100 is first powered up. When the converter 100 is first powered up, the current flowing out of the RT pin is determined by the resistors 155 and 156 because the capacitor 158 is still discharged. As the capacitor 158 is charged during startup, the current flowing out of the RT pin decreases, thereby causing the operating frequency to decrease. Because the gain curve of the converter 100 is inversely proportional to operating frequency, the gain of the converter 100 is controlled to smoothly increase from startup due to the charging of the capacitor 158. Once the capacitor 158 is fully charged, the soft-start circuit formed by the capacitor 158 and resistor 156 no longer affects the operating frequency of the converter 100. The operating frequency at that time is determined by the resistors 155 and 157 and the impedance presented by the opto-coupler transistor 152 to the RT pin. The minimum and maximum operating frequencies of the converter 100 may be set by appropriate selection of the values of the resistors 155 and 157.

While the converter 100 is more than suitable for its intended application, it may generate audible noise in light load conditions with pulse-skipping and bursting. Generally speaking, there is no audible noise during normal operation because the operating frequency of the converter is much higher than the range of frequencies that can be heard by human beings. However, when pulse-skipping or bursting, the operating frequency may drop down to audible frequency range (e.g., several kHz). Although the audible noise is potentially distracting to some consumers, it is heretofore relatively difficult and expensive to implement a circuit to prevent or minimize the audible noise.

Figure 2:
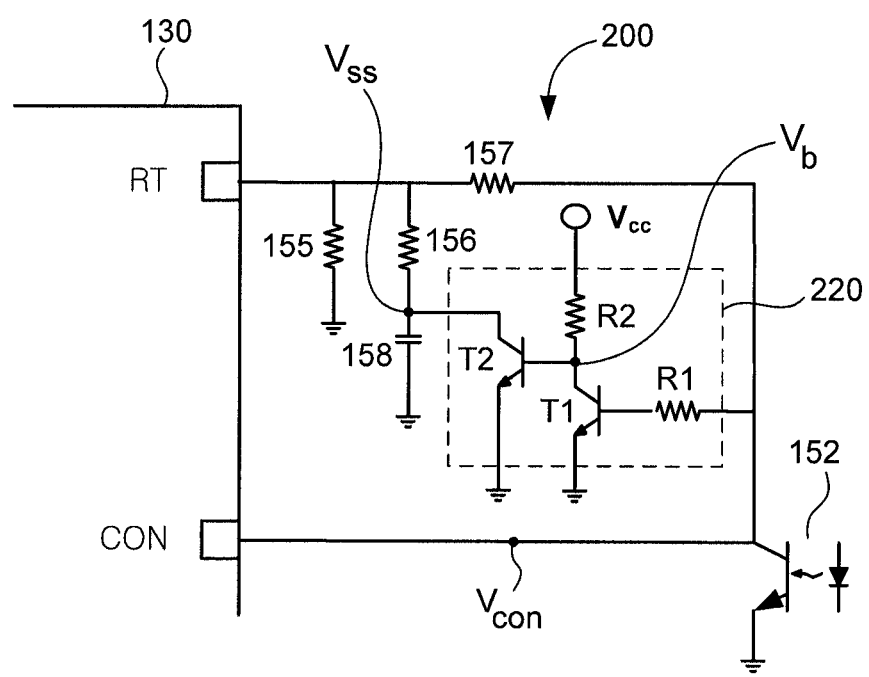
FIG. 2 schematically shows a soft-burst circuit in accordance with an embodiment of the present invention.

FIG. 2 schematically shows a soft-burst circuit 220 in accordance with an embodiment of the present invention. The soft-burst circuit 220 is configured to prevent or minimize audible noise in the converter 100. In the example of FIG. 2, the soft-burst circuit 220 is implemented as part of a frequency setting circuit 200. The circuit 200 may be used in lieu of the frequency setting circuit 120 of FIG. 1. That is, in the converter 100 of FIG. 1, the circuit 200 may be electrically connected to the integrated circuit 130 instead of the circuit 120. The modified converter 100 that employs the circuit 200 (instead of the circuit 120) is also referred to herein as the "improved converter."

The circuit 200 includes the resistors 155, 156, and 157, the capacitor 158, and the opto-coupler transistor 152. These components provide the same functionality as in FIG. 1.

In the example of FIG. 2, the soft-burst circuit 220 comprises a bipolar transistor T1, a bipolar transistor T2, and resistors R1 and R2. The capacitor 158 is in series with the resistor 156, which is electrically coupled to the RT pin of the integrated circuit 130. The monitored output voltage, which serves as a frequency control signal by varying the impedance of the opto-coupler transistor 152, is electrically coupled to the base of the transistor T1 by way of the resistor R1. The base of the transistor T1 is also electrically coupled to the RT pin by way of the resistors R1 and 157. The collector of the transistor T1 is electrically coupled to the gate of the transistor T2. The gate of the transistor T2 is also electrically coupled to a supply voltage $V_{CC}$ by way of a resistor R2. The collector of the transistor T2 is electrically coupled to the node of the capacitor 158 that is not electrically coupled to ground. When the transistor T1 is ON, the transistor T2 is turned OFF and thereby allows the frequency control signal to charge the capacitor 158 by way of the resistors 157 and 156. When the transistor T1 is OFF, the transistor T2 is turned ON to discharge the capacitor 158.

Figure 3:
FIG. 3 shows a timing diagram for an improved converter in accordance with an embodiment of the present invention during light load conditions.
Figure 4:
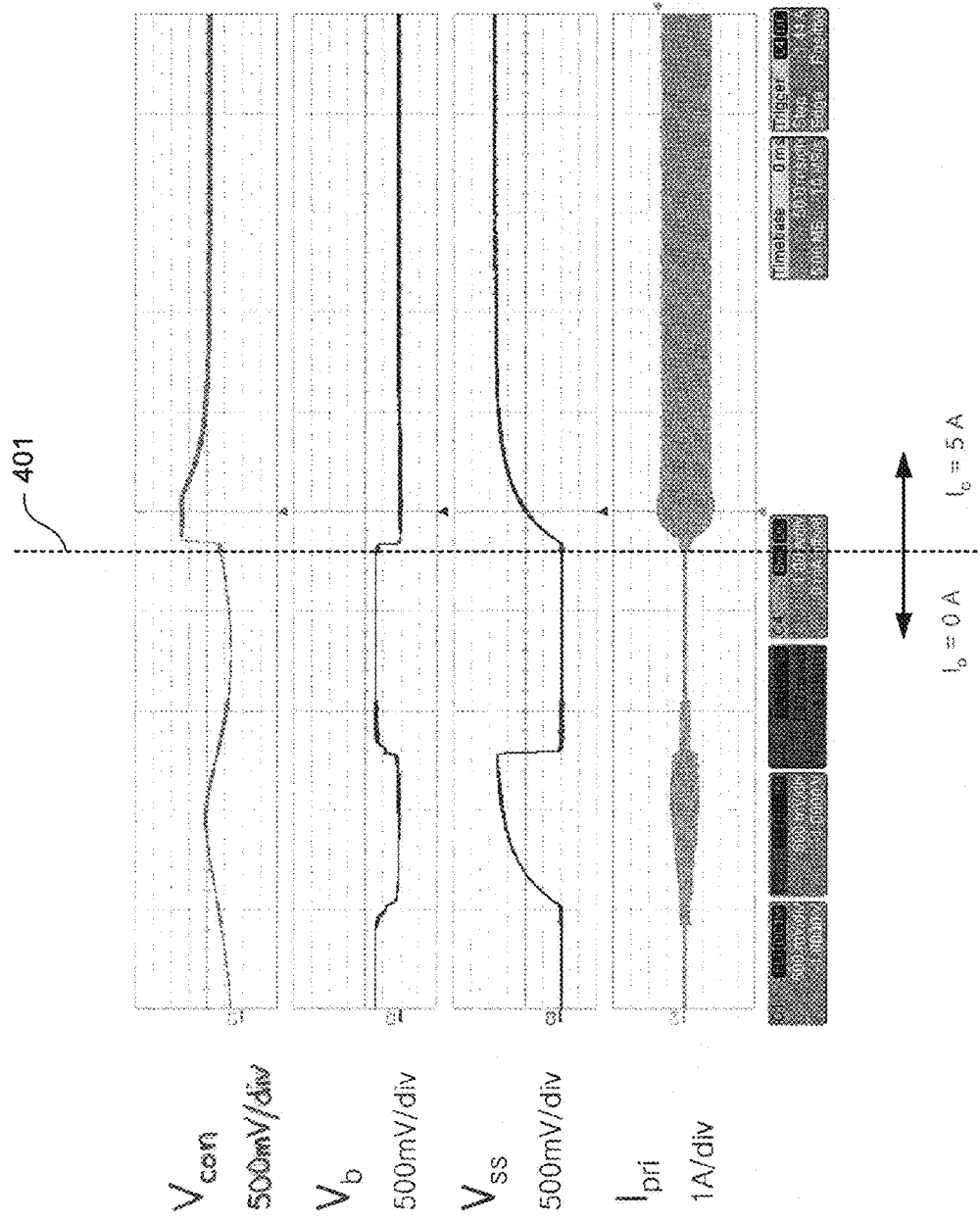
FIG. 4 shows a timing diagram for an improved converter in accordance with an embodiment of the present invention transitioning from light load conditions with pulse-skipping and bursting to normal mode of operation.

The operation of the soft-burst circuit 220 is now further explained with reference to the timing diagrams of FIGS. 3 and 4. In FIGS. 3 and 4, the signals $V_{CON}$, $V_b$, and $V_{SS}$ are voltage signals on nodes that are noted in FIG. 2. The signal $I_{PRI}$ is the corresponding current through the primary winding of the transformer 160 shown in FIG. 1. The horizontal axis represents time.

FIG. 3 shows a timing diagram for the improved converter with the frequency setting circuit 200 during light load conditions, wherein the load coupled to the converter is not drawing significant amount of output current $I_O$. The example of FIG. 3 is for an input voltage $V_{IN}$ of 400 VDC, output voltage $V_O$ of 24 VDC, and an output current $I_O$ of zero.

Referring to FIGS. 2 and 3, the control voltage $V_{CON}$ is on the collector of the opto-coupler transistor 152, and is a control voltage representative of the monitored output voltage. The control voltage $V_{CON}$ serves as the frequency control signal because it corresponds to the impedance presented by the opto-coupler 152 to the RT pin, and thus controls the operating frequency of the improved converter. In the case of FIG. 2, the control voltage $V_{CON}$ (and hence the frequency control signal) is used by the soft-burst circuit 220 to determine when to discharge the capacitor 158 to minimize or prevent audible noise.

In light load conditions, the improved converter enters pulse-skipping mode as indicated in FIG. 3 by the non-constant current flow through the primary winding of the transformer 160 (see waveform of current $I_{PRI}$ in FIG. 3). In pulse skipping mode, the output transistors M1 and M2 are not continuously switched. Instead, there are periods where switching of the output transistors M1 and M2 is stopped to save energy. Pulse skipping is so named because pulses that would otherwise drive the transistors M1 and M2 to switch are skipped. In-between pulse skipping, the improved converter may enter burst mode to deliver power to the load to maintain regulation while in light load condition. When the control voltage $V_{CON}$ becomes sufficiently low, which may occur during light load conditions, the transistor T1 turns OFF, which allows the transistor T2 to turn ON and discharge the capacitor 158. Discharging of the capacitor 158 lowers the gain of the improved converter, and allows the gain of the improved converter to increase back up in a controlled fashion as the capacitor 158 charges, thereby suppressing initial current peaks of the primary winding current $I_{PRI}$ to minimize or prevent audible noise.

FIG. 3 shows that that the amplitude of the sine wave of the primary winding current $I_{PRI}$ increases smoothly. Because the amplitude of the primary winding current $I_{PRI}$ is proportional to the amount of audible noise, the relatively small amplitude of the primary winding current $I_{PRI}$, especially in the initial current peaks, indicates that the improved converter advantageously generates no or a relatively small amount of audible noise.

FIG. 4 shows a timing diagram for the improved converter with the frequency setting circuit 200 transitioning from light load to high load condition. The example of FIG. 4 is for an input voltage $V_{IN}$ of 400 VDC, output voltage $V_O$ of 24 VDC, and an output current $I_O$ transitioning from 0 to 5 A at a point in time indicated by the dashed marker 401. The signals $V_{CON}$, $V_b$, $V_{SS}$, and $I_{PRI}$ on the left side of the marker 401 are as previously described with reference to FIG. 3.

When the load starts drawing more current, the improved converter goes from pulse-skipping and burst mode into normal mode of operation, wherein it resumes normal switching of the output transistors M1 and M2 (see FIG. 1) to deliver power to the load. As shown in FIG. 4, the improved converter advantageously reduces the peak of the primary winding current $I_{PRI}$ to minimize or prevent audible noise even during transitions from pulse-skipping and burst mode to normal mode of operation.

In light of the present disclosure, one of ordinary skill in the art will appreciate that the above-described techniques for addressing audible noise problems in switched-mode power supplies are applicable to different power supply topologies and integrated circuit controllers. Embodiments of the present invention thus advantageously allow use of soft-burst circuits that have relatively small number of parts, allowing for ease of implementation even in cost-sensitive applications.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A soft-burst circuit for a switched-mode power supply, the circuit comprising:
    an integrated circuit configured to control switching of an output transistor to deliver a regulated output voltage to a load, the integrated circuit having a control pin for receiving a control signal for setting an operating frequency of the switched-mode power supply;
    a capacitor coupled to the control pin through a first resistor, the capacitor having a first terminal coupled in series to a first terminal of the first resistor;
    a first transistor having a first terminal coupled to receive the control signal; and
    a second transistor having a first terminal coupled to a second terminal of the first transistor, the first terminal of the second transistor being coupled to a reference signal, the second transistor having a second terminal coupled to the first terminal of the capacitor, the second transistor being configured to discharge the capacitor based on the control signal, a switching of the second transistor being controlled by the first transistor.

2. The circuit of claim 1 wherein the first transistor and the second transistor comprise bipolar transistors, a base of the first transistor is coupled to the control signal, a collector of the first transistor is coupled to a base of the second transistor, and a collector of the second transistor is coupled to the first terminal of the capacitor.

3. The circuit of claim 1 wherein the integrated circuit controls switching of the output transistor by pulse frequency modulation (PFM).

4. The circuit of claim 1 wherein a second terminal of the capacitor is coupled to ground.

5. The circuit of claim 1 wherein the integrated circuit is configured to synchronously switch the output transistor and another output transistor.

6. The circuit of claim 5 wherein the output transistor comprises metal oxide semiconductor field effect transistors.

7. The circuit of claim 1 wherein the control signal is indicative of a level of the output voltage.

8. A method of controlling a switched-mode power supply, the method comprising:
    generating an output voltage of a switched-mode power supply;
    monitoring the output voltage to generate a frequency control signal that controls an operating frequency of the switched-mode power supply;
    charging a storage device using the frequency control signal; and
    after the charging of the storage device, discharging the storage device when the frequency control signal reduces to a particular level, wherein the particular level is a voltage level that turns OFF a first transistor for turning ON a second transistor that is coupled across the storage device.

9. The method of claim 8 wherein the storage device comprises a capacitor.

10. The method of claim 8 wherein the frequency control signal comprises a voltage corresponding to an impedance of an opto-coupler transistor.

11. The method of claim 8 further comprising:
    using the frequency control signal to enable or disable protection features of an integrated circuit configured to control the operating frequency of the switched-mode power supply.

12. A switched-mode power supply comprising:
    an output transistor coupled to a primary winding of a transformer;
    a control circuit configured to control switching of the output transistor to deliver a regulated output voltage to a load of the switched-mode power supply;
    a storage device coupled to a pin of the control circuit, the pin of the control circuit being configured to receive a control signal for adjusting an operating frequency of the switched-mode power supply, wherein the storage device comprises a capacitor; and
    a soft-burst circuit configured to discharge the storage device based on the control signal, wherein the soft bust circuit comprises:
        a first transistor having a first terminal coupled to receive the control signal; and
        a second transistor having a first terminal coupled to a second terminal of the first transistor, the first terminal of the second transistor being coupled to a reference signal, the second transistor having a second terminal coupled to a first terminal of the capacitor, the second transistor being configured to discharge the capacitor based on the control signal, a switching of the second transistor being controlled by the first transistor.

13. The switched-mode power supply of claim 12 wherein the first and second transistors comprise bipolar transistors, a base of the first transistor is coupled to the control signal, a collector of the first transistor is coupled to a base of the second transistor, and a collector of the second transistor is coupled to the first terminal of the capacitor.

14. The switched-mode power supply of claim 12 wherein the control circuit synchronously switches the output transistor and another output transistor.

15. The switched-mode power supply of claim 14 wherein the output transistor and the other output transistor comprise metal oxide semiconductor field effect transistors.

16. The switched-mode power supply of claim 12 wherein the control signal is indicative of a level of the output voltage.

17. The switched-mode power supply of claim 12 wherein the switched-mode power supply comprises an LLC resonant half-bridge converter.

* * * * *